(No Model.)
J. W. YOUNG.
EARTHENWARE LIQUID MEASURE.
No. 258,845. Patented May 30, 1882.
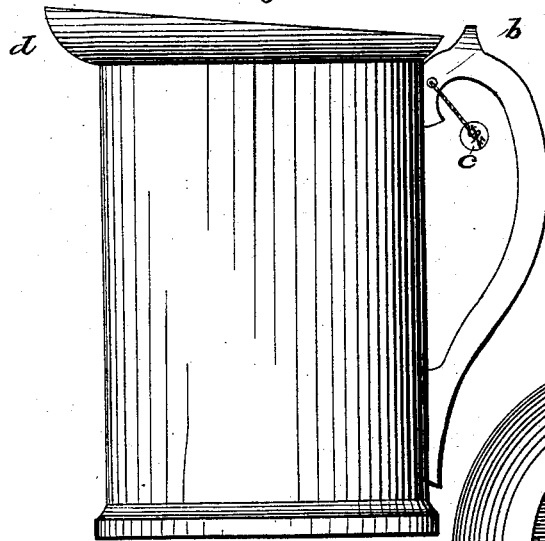
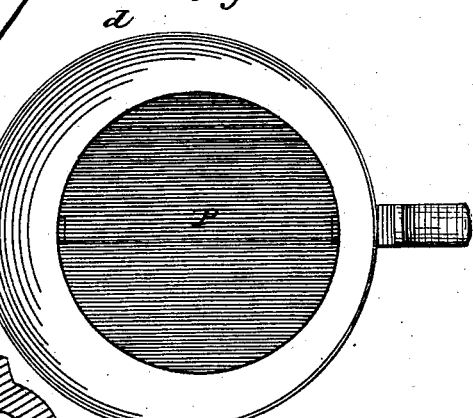
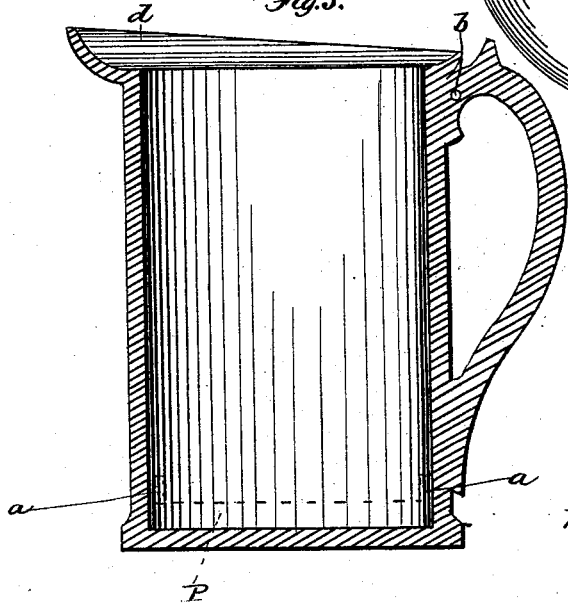
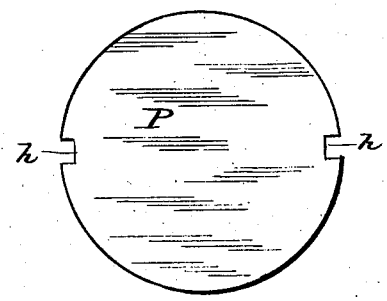
Witnesses:
Inventor:
John W. Young

UNITED STATES PATENT OFFICE.

JOHN W. YOUNG, OF EAST LIVERPOOL, OHIO, ASSIGNOR OF ONE-THIRD TO WM. BRUNT, JR., OF SAME PLACE.

EARTHENWARE LIQUID-MEASURE.

SPECIFICATION forming part of Letters Patent No. 258,845, dated May 30, 1882.

Application filed December 5, 1881. (No model.)

*To all whom it may concern:*

Be it known that I, JOHN W. YOUNG, of East Liverpool, in the county of Columbiana and State of Ohio, have invented certain new and useful Improvements in Liquid-Measures of Stone-China or Earthenware; and I do hereby declare the following to be a full, clear, and exact description of the same, reference being had to the accompanying drawings, forming a part of this specification, in which—

Figure 1 is a side elevation; Fig. 2, a top plan view. Fig. 3 is a longitudinal vertical section taken on the line $x\ x$, Fig. 1. Fig. 4 is a view of the removable supplemental piece.

Similar letters of reference in the several figures indicate the same parts.

The object of my invention is to provide for general use, and especially for the use of grocers, druggists, and other dealers in liquids, a measure, or set of measures, of standard capacity, that will be cheap and very durable, and that will not corrode or be affected by vinegar or other acids or liquids that require to be measured.

To this end the invention consists of a measure for liquids, constructed of glazed or unglazed earthenware, and having a removable supplemental piece secured in its bottom, substantially as I will now proceed to describe.

In making the measures of earthenware care is required to so shape them as to allow of the requisite shrinkage, and, even with the greatest care in manufacture, some of the measures will fall below and some be above the standard size. Those that fall below have to be broken and thrown away; but in order to preserve those that are above size I have devised the plan of inserting into them a piece of glazed earthenware, P, just large enough to make the necessary displacement to bring the capacity of the measure to the standard. This supplementary piece may be secured in the bottom by screwing it into place, its edge being screw-threaded, and the interior of the measure being correspondingly screw-threaded near the bottom to receive it, or projections $a\ a$ (shown in dotted lines, Fig. 2,) may be made on the interior of the measure near the bottom, and the supplemental piece may have notches or slots $h\ h$ in it, as indicated in Fig. 4, to admit the projections, so that the piece may be dropped below the projections and turned around, thus preventing its displacement when the measure is upturned. Other modes of securing the piece in the bottom may be devised without departing from the spirit of my invention in this particular.

The flange $d$ around the mouth of the measure prevents the running over of the contents when the body of the measure is perfectly full, and the front portion of said flange forms the pouring-spout.

In order that the measures may be properly stamped by the inspector of weights and measures, a perforation, $b$, is preferably formed in the handle, and a wire is inserted through and is joined by a sealing-tag, $c$. Upon this tag the inspector makes his mark.

Measures constructed in this manner possess the advantage of resisting the action of vinegar, acids, and other liquids required to be measured by them, besides being much more easily and thoroughly cleaned than metal measures, the simple washing in water enabling them to be made entirely clean after containing most any liquid. The supplemental piece in the bottom will not ordinarily fall out when the measure is inverted; but when it is necessary to clean the measure it can, after proper manipulation, be taken out and replaced again. The interior of the measure, being glazed and perfectly smooth, offers less resistance and friction to the pouring of viscous fluids—such as molasses—and much time is thus saved in handling such fluids.

I claim as my invention—

1. The combination, with an earthenware measure for measuring liquids, of a supplemental piece adapted to be secured in the bottom of a measure so as not to fall out when the measure is inverted, and also capable of being removed when the measure is being cleaned, substantially as described.

2. The combination, with the herein-described earthenware measure, having the projections $a\ a$ near its bottom, of the removable supplemental piece P, having the notches $h\ h$ on its edges, substantially as described.

JOHN W. YOUNG.

Witnesses:
FRED F. CHURCH,
MELVILLE CHURCH.